UNITED STATES PATENT OFFICE.

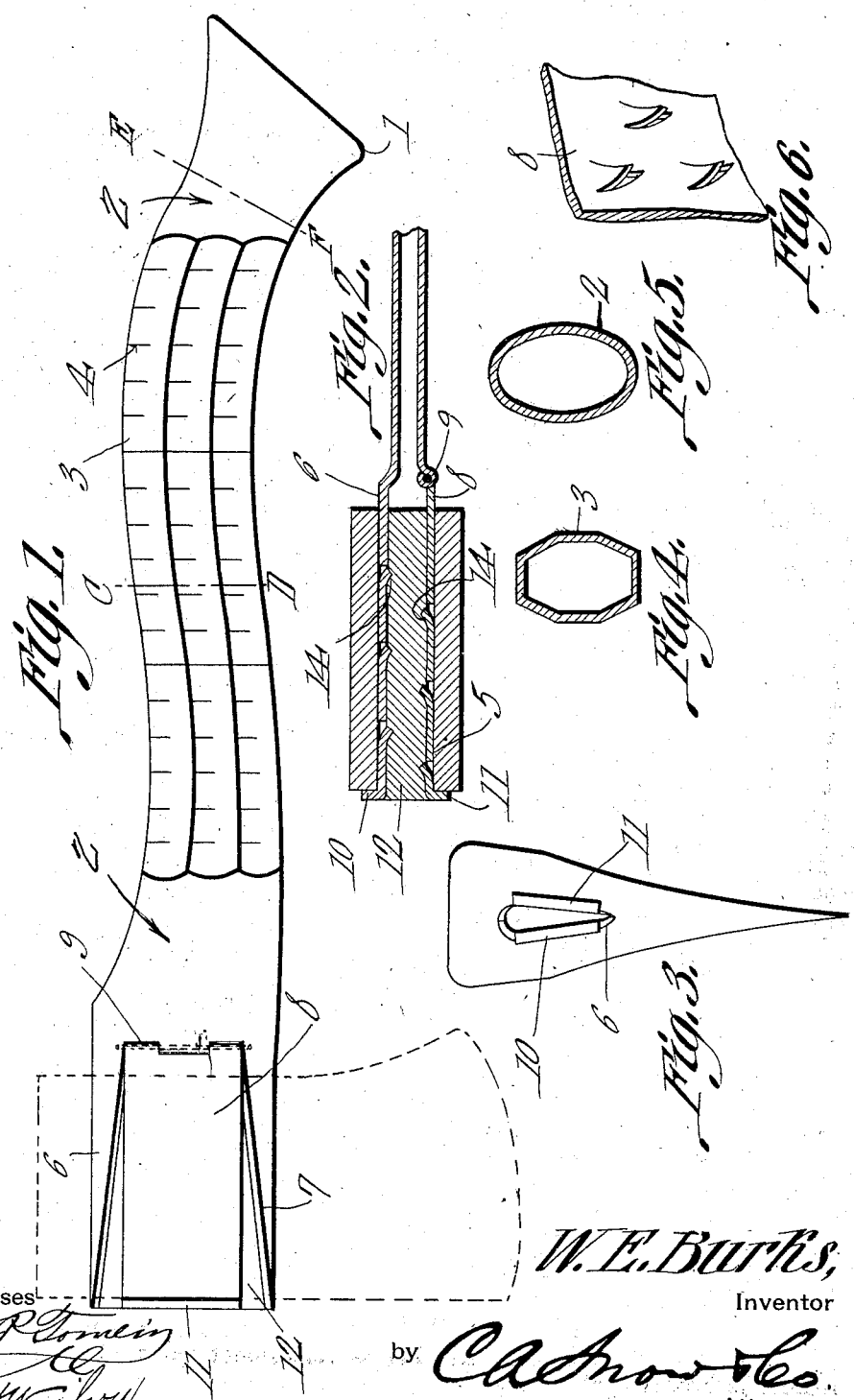

WILLIAM EDWARD BURKS, OF GRIT, TEXAS.

AX-HANDLE.

1,054,823.	Specification of Letters Patent.	Patented Mar. 4, 1913.

Application filed January 20, 1912. Serial No. 672,510.

*To all whom it may concern:*

Be it known that I, WILLIAM EDWARD BURKS, a citizen of the United States, residing at Grit, in the county of Mason and State of Texas, have invented a new and useful Ax-Handle, of which the following is a specification.

The device forming the subject-matter of this application, is a tubular ax handle, including hingedly connected parts, adapted to be inserted into the eye of an ax head, means being provided for effecting a separation of said parts, thereby to grip the ax head.

The invention aims to provide a handle including coöperating members of novel and improved form, constituting a means for engaging an ax head, within the eye thereof, said members being provided with means adapted to hold the ax head upon the handle, and one of said members being equipped with means adapted to prevent a withdrawal of the wedge whereby said members are spread apart to engage the ax head.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in side elevation, an ax handle constructed in accordance with the present invention; Fig. 2 is a fragmental longitudinal section of that portion of the handle which is engaged within the ax head; Fig. 3 is an end view of an ax head showing the device of the present invention mounted therein; Fig. 4 is a section upon the line C—D of Fig. 1; and Fig. 5 is a section upon the line E—F of Fig. 1. Fig. 6 is a fragmental perspective of the inner face of that portion of the handle which fits into the eye of the ax head.

In carrying out the invention there is provided a tubular handle 1, preferably fashioned from malleable iron. Adjacent its ends, the handle is approximately oval in section, as indicated at 2. Intermediate its ends, the handle 1 is fashioned into octagonal form, as shown at 3, the faces of the octagonal part 3 being graduated as shown at 4, to facilitate the laying off of wood into predetermined lengths.

That end of the handle 1 which is inserted into the eye of the ax head 5, terminates in a trough-shaped portion 6, the edges of which preferably diverge toward the free end of the portion 6, as shown at 7. To the handle 1 is hinged a movable member 8, as shown at 9, this member 8 being adapted to swing inwardly, upon its hinged mounting 9, between the edges 7 of the trough-shaped portion 6. The portion 6 is equipped with an outwardly extended lip 10, adapted to overlap the outer face of the ax head 5, and the movable member 8 is equipped with a similar lip 11, having a like function. The invention further includes a wedge 12, conforming closely to the interior of the tubular handle, the member 12 being insertible between the parts 6 and 8, to effect an outward swinging of the part 8, upon its hinged mounting 9, so that the ax head 5 may be gripped and held in position. In order to maintain the wedge member 12 in place, the parts 6 and 8 are equipped with a series of inwardly projecting prongs 14, inclined to permit a ready insertion of the member 12, but adapted to prevent a withdrawal of the same.

In practical operation, the movable member 8 is swung inwardly, upon its hinged mounting 9, between the edges 7 of the part 6, the lip 11 being thus retracted, so that the end of the ax handle may be inserted into the eye of the head 5, it being noted that the lips 10 and 11 do not extend the full width of the parts 6 and 8, respectively. When the handle of the ax is thus inserted into the eye of the head 5, the wedge member 12 is driven to place, the movable element 8 being forced outwardly, to bind against the head 5 of the ax. At the same time, the lips 10 and 11 will engage the outer end face of the head 5, as clearly shown in Fig. 2. The prongs 14, as hereinbefore described, will engage the wedge member 12, and hold the same in place against withdrawal.

Having thus described the invention, what is claimed is:—

In a handle fastening, a handle comprising as constituent parts, a tubular portion having an opening at one side adapted to lie in the eye of a tool-head and a member hingedly connected with the tubular portion at one end of the opening for free movement in the opening longitudinally of the tubular portion; one of said constituent parts having a projection in its interior slanting toward the axis of the tubular portion and away from the head-engaging end of the tubular portion; and a wedge in the tubular portion, the wedge being engaged with the projection.

In testimony that I claim the foregoing as my own, I have hereto affixed my signature in the presence of two witnesses.

WILLIAM EDWARD BURKS.

Witnesses:
 WALT M. MARTIN,
 W. E. JORDAN.